May 2, 1933.  C. K. DUNLAP  1,906,788
SPOOL
Original Filed March 9, 1931
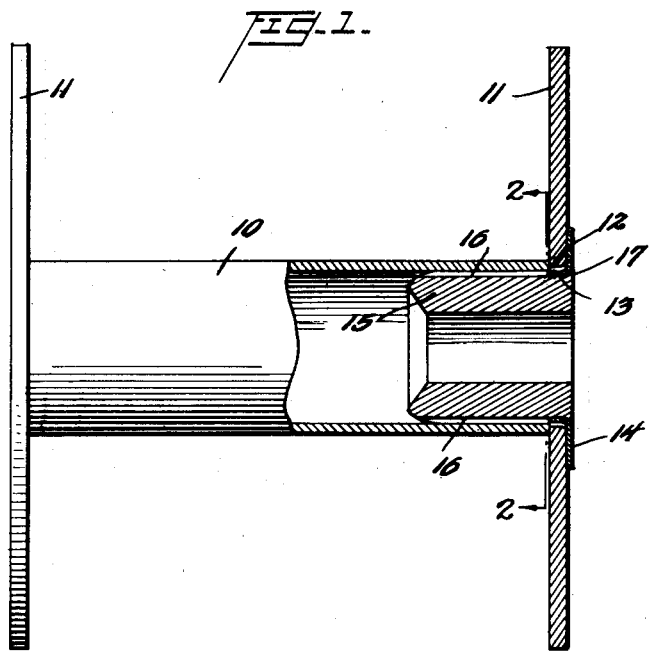
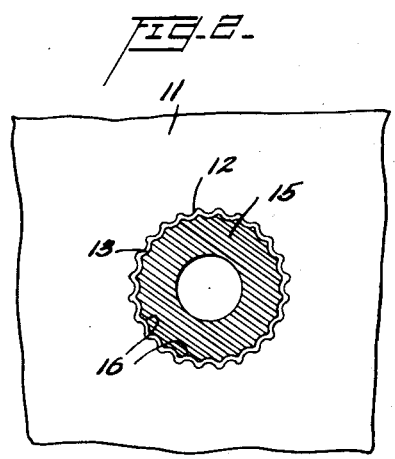
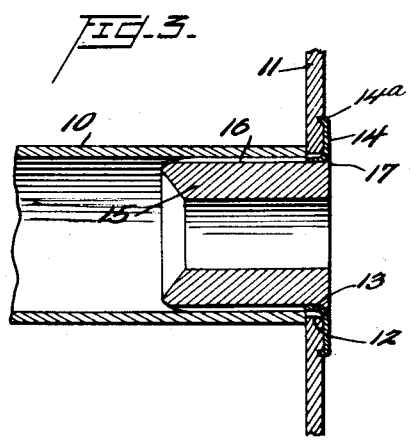
Inventor
Charles K. Dunlap,
By Watson, Cait, Morse & Grindle
Attorneys Patented May 2, 1933

1,906,788

UNITED STATES PATENT OFFICE

CHARLES K. DUNLAP, OF DARLINGTON, SOUTH CAROLINA, ASSIGNOR TO SONOCO PRODUCTS COMPANY, OF HARTSVILLE, SOUTH CAROLINA, A CORPORATION OF SOUTH CAROLINA

SPOOL

Application filed March 9, 1931. Serial No. 521,357.

This invention relates to spools, bobbins and the like and its object is to provide an article of that kind which is simple in construction, which can be cheaply and rapidly produced and which, at the same time, is sufficiently strong and rigid to withstand the rough usage to which such devices are subjected.

The invention is illustrated in the accompanying drawing, forming a part hereof, in which:

Figure 1 is a side elevation of a spool, one end of which is shown in longitudinal section;

Figure 2 is a transverse section on line 2—2 of Fig. 1; and

Figure 3 is a fragmentary longitudinal section showing a slightly modified arrangement.

The spool illustrated comprises a barrel 10 and heads 11 secured thereto. The heads 11 are preferably made from heavy paper or fiber board and the barrel may also be made from similar material. The invention is concerned particularly with the means for securing the heads to the barrel. Such securing means are sufficiently illustrated in combination with one of the heads only. The barrel 10, usually of cylindrical form, has a cylindrical opening in the end thereof and the head 11 has a circular opening 12 which registers with the opening in the barrel. Mounted in the opening 12 of the head is a short metal ferrule 13 preferably being of a length substantially equal to the thickness of the head 11. The ferrule 13 has a flange 14 which engages the outer surface of the head 11. In the form shown in Figure 3, the outer edge of the flange 14 is bent inwardly as shown at 14a to provide a supplemental flange which engages a circular groove in the outer surface of the head 11.

The ferrule 13, or that part of it lying within the opening 12, is corrugated, as clearly shown in Figure 2, and the outer surface of such corrugated portion is embedded in or tightly engages the material of the head 11 surrounding the opening 12 and by this means the ferrule is firmly secured in the head.

A plug 15, preferably made of wood, is mounted in the ferrule 13 and extends into the cylindrical opening in the barrel 10. This plug on its outer surface is provided with longitudinal grooves 16 which correspond substantially with the corrugations in the ferrule 12, such grooves being formed in the plug before it is inserted in the ferrule 13 and barrel 10. At its outer end the plug 15 is slightly enlarged, as shown at 17, so that when the plug is forced through the ferrule such enlarged end will tightly engage the inner surface of the ferrule and also slightly expand the same into firm engagement with the material of the head 11.

The portion of the plug 15 lying within the barrel 10 is made of such size as to tightly fit the opening therein. This serves to hold the plug in the barrel. To further fasten the plug to the barrel the former is coated with a suitable glue or cement before being inserted and such glue or cement will enter the groove 16 of the plug and, after drying, will form small masses or keys of cement which serve to very effectively maintain the plug in the barrel.

In assembling the parts, the corrugated ferrule is forced tightly into the opening in the head or, if preferred, an uncorrugated ferrule may first be placed in the opening in the head and then corrugated in any suitable manner, by which the corrugations are forced into the material of the head. The plug 15 is then forced through the ferrule and into the barrel 10, the plug being preferably provided with the grooves 16, which register substantially with the corrugated inner surface of the ferrule. The slightly enlarged outer end 17 of the plug serves to tightly wedge the plug in the ferrule and at the same time expand the latter more firmly into engagement with the head 11 so that the head and plug 15 are securely fastened together. The glue or cement on the portion of the plug within the barrel serves to securely fasten the plug to the barrel, the grooves in the outer surface of the plug affording recesses into which the glue may flow and thus form keys or wedges of the same, insuring firm adhesion of the plug to the barrel. The ferrule 12 is made short or substantially equal to the thickness of the head so as to permit a large area of contact between the outer surface of the plug and the inner surface of the barrel for receiving the glue or cement.

Having thus described the invention, what is claimed as new and desired to be secured by Letters Patent is:

A spool or the like having a barrel provided with a relatively smooth walled cylindrical opening in the end thereof, a head for the spool having an opening therein registering with the opening in the barrel, a metal ferrule arranged in the opening in the head, being of a length substantially equal to the thickness of the material of the head, said ferrule having corrugations therein adapted to be embedded in the material of the head surrounding the opening therein, a flange on said ferrule engaging the outer surface of the head, a plug mounted in and closely engaging said ferrule and extending into the opening in said barrel beyond said ferrule and closely fitting the opening in the barrel, said plug having longitudinal grooves formed on the outer surface thereof for engaging in the corrugations in said ferrule whereby said plug may be forced through said ferrule and into said barrel, said plug having an enlarged outer end for tightly engaging in the ferrule and expanding the same into firm engagement with the head, and adhesive disposed between the grooved surface of said plug and the relatively smooth inner surface of the opening in the barrel, whereby longitudinal wedges or keys of said adhesive are provided within said grooves for more firmly uniting the plug and barrel.

In testimony whereof I hereunto affix my signature.

CHARLES K. DUNLAP.